(12) United States Patent
Fischer et al.

(10) Patent No.: US 10,661,926 B2
(45) Date of Patent: May 26, 2020

(54) APPARATUS FOR SEALING AN OPHTHALMIC LENS PACKAGE

(71) Applicant: Novartis AG, Basel (CH)

(72) Inventors: Alfred Fischer, Niedernberg (DE);
Elmar Kuther, Grosswallstadt (DE);
Volker Lanig, Giebelstadt (DE);
Dietmar Berghänel, Chemnitz (DE)

(73) Assignee: Alcon Inc., Fribourg (CH)

( * ) Notice: Subject to any disclaimer, the term of this patent is extended or adjusted under 35 U.S.C. 154(b) by 240 days.

(21) Appl. No.: 15/832,314

(22) Filed: Dec. 5, 2017

(65) Prior Publication Data

US 2018/0162570 A1 Jun. 14, 2018

Related U.S. Application Data

(60) Provisional application No. 62/431,647, filed on Dec. 8, 2016.

(51) Int. Cl.
*B29C 65/00* (2006.01)
*B65B 25/00* (2006.01)
(Continued)

(52) U.S. Cl.
CPC ............ *B65B 25/008* (2013.01); *B29C 65/02* (2013.01); *B29C 65/18* (2013.01);
(Continued)

(58) Field of Classification Search
CPC ........... B65B 25/008; B29C 2011/0041; F16D 2003/22303; F16D 3/16
See application file for complete search history.

(56) References Cited

U.S. PATENT DOCUMENTS

| 2,067,286 A * | 1/1937 | Pearce | F16D 3/32 |
| | | | 464/118 |
| 2,313,279 A * | 3/1943 | Suczek | F16D 3/223 |
| | | | 464/146 |

(Continued)

FOREIGN PATENT DOCUMENTS

WO 03/097460 A1 11/2003

*Primary Examiner* — Andrew M Tecco
*Assistant Examiner* — Eyamindae C Jallow
(74) *Attorney, Agent, or Firm* — Patrick M. Ryan

(57) ABSTRACT

An apparatus for thermally bonding together a cover film of an ophthalmic lens package and a base part of the package, including a carrier for supporting the base part with film arranged thereon; a bonding unit above the carrier having a mounting plate with a bonding stamp extending therefrom, the bonding stamp having a mounting portion fixedly attached to the mounting plate, a bonding head arranged beneath the mounting portion with a heatable bonding contour on a side of the bonding head facing the carrier, and an articulated connector arranged between and connecting the mounting portion and the bonding head; and an actuator for performing movement of the carrier and the bonding stamp towards and away from each other for thermally bonding the film with the base part by pressing the heated bonding contour against the film and subsequent separation of the bonding head from the cover film bonded to the base part, the articulated connector being a cardanic joint with two rotational axes.

17 Claims, 4 Drawing Sheets

(51) Int. Cl.
  *B29C 65/78* (2006.01)
  *B65B 51/14* (2006.01)
  *B29C 65/18* (2006.01)
  *B65B 51/10* (2006.01)
  *B29C 65/02* (2006.01)
  *B65B 7/28* (2006.01)
  *B29L 11/00* (2006.01)
  *B29L 31/00* (2006.01)

(52) U.S. Cl.
  CPC ...... *B29C 65/7802* (2013.01); *B29C 65/7841* (2013.01); *B29C 66/1122* (2013.01); *B29C 66/242* (2013.01); *B29C 66/244* (2013.01); *B29C 66/53461* (2013.01); *B29C 66/8161* (2013.01); *B29C 66/8163* (2013.01); *B29C 66/8167* (2013.01); *B29C 66/824* (2013.01); *B29C 66/8322* (2013.01); *B65B 7/2878* (2013.01); *B65B 51/10* (2013.01); *B65B 51/14* (2013.01); *B29C 66/24221* (2013.01); *B29C 66/849* (2013.01); *B29L 2011/0041* (2013.01); *B29L 2031/7164* (2013.01); *B65D 2585/545* (2013.01)

(56) References Cited

U.S. PATENT DOCUMENTS

| | | | |
|---|---|---|---|
| 5,524,419 A * | 6/1996 | Shannon | B29C 33/36 264/1.1 |
| 5,525,110 A * | 6/1996 | Riccitelli | B62D 1/16 464/118 |
| 6,413,334 B1 | 7/2002 | Rittner et al. | |
| 6,637,491 B2 * | 10/2003 | Massey | B29C 65/18 156/581 |
| 2004/0112008 A1 * | 6/2004 | Voss | B29D 11/00067 53/329.3 |
| 2007/0157553 A1 * | 7/2007 | Voss | B65B 25/008 53/329 |
| 2015/0031463 A1 * | 1/2015 | Lenz | F16D 3/16 464/125 |
| 2017/0165901 A1 * | 6/2017 | Fischer | B29C 65/18 |

* cited by examiner

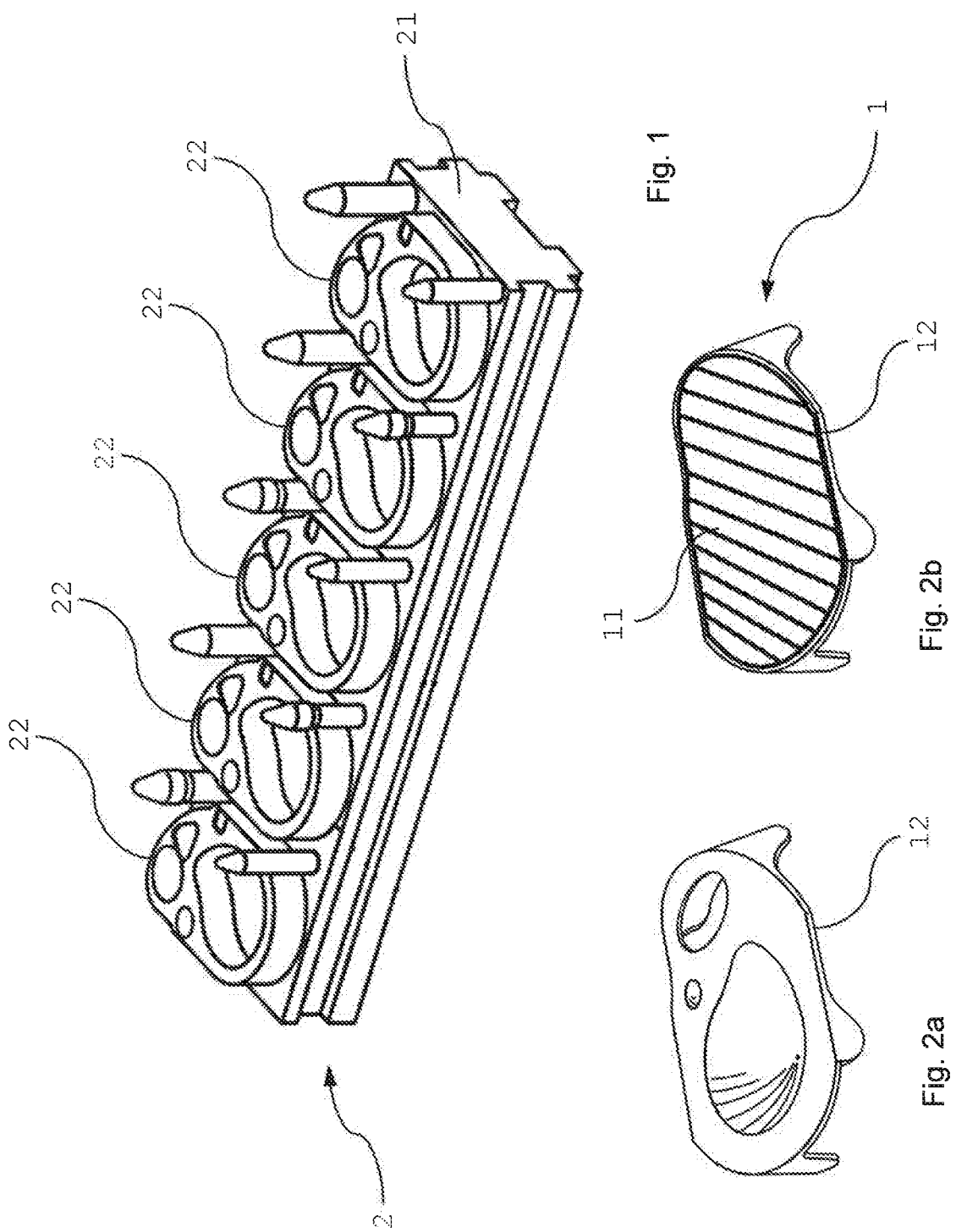

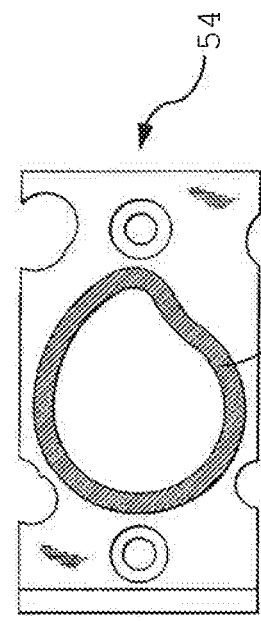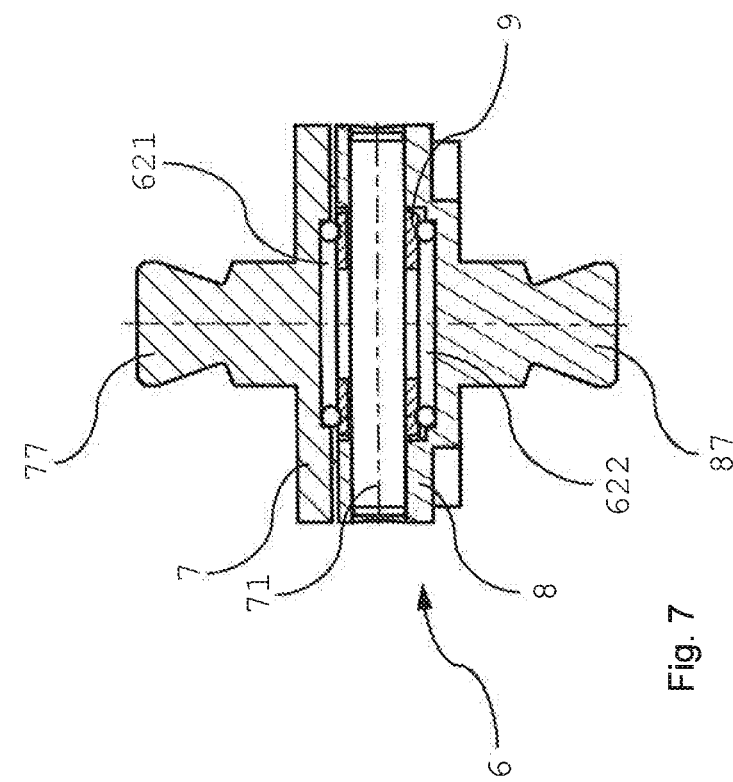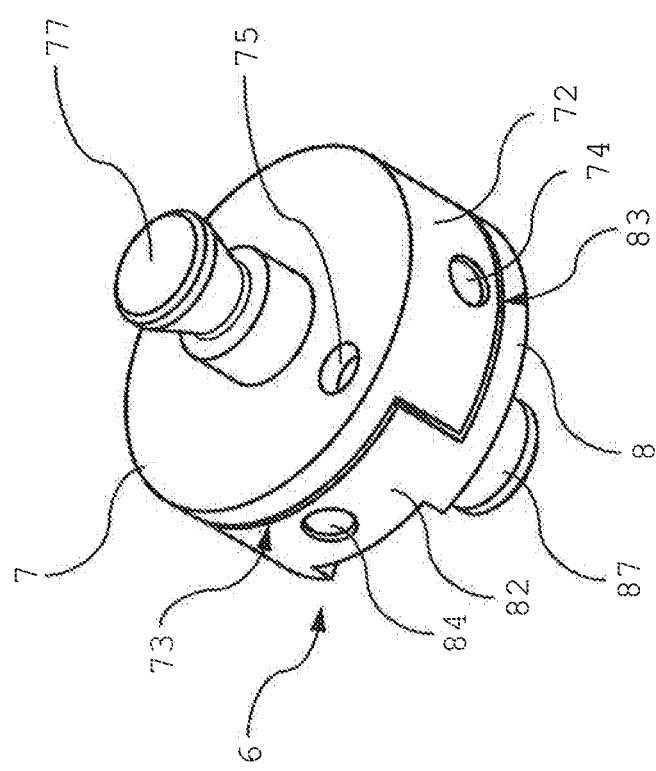

APPARATUS FOR SEALING AN OPHTHALMIC LENS PACKAGE

This application claims the benefit under 35 U.S.C. § 119(e) of U.S. provisional application Ser. No. 62/431,647, filed on Dec. 8, 2016, incorporated herein by reference in its entirety.

FIELD OF THE INVENTION

The invention relates to an apparatus for thermally bonding together a cover film of an ophthalmic lens package, such as a contact lens package, in particular a soft contact lens package, and a base part of the ophthalmic lens package.

BACKGROUND OF THE INVENTION

Apparatuses of the above-mentioned kind are already used today in a large number of variants where a specific article, especially a contact lens, is to be packed in a tightly sealed manner in a packaging. This is generally accomplished by introducing a contact lens into a depression of a base part of a packaging, dispensing a predetermined amount of a saline solution into the depression, then placing onto the packaging a cover film that can be thermally bonded to the base part of the packaging, and finally thermally bonding the cover film to the packaging. This operation may then be followed by sterilization. The packaging containing the contact lens can then be delivered to the customer or to the optician or ophthalmologist.

It will be readily apparent that especially in the field of the packaging of contact lenses, but also, for example, in the fields of foodstuffs, pharmaceuticals, medicinal articles and some other fields, certain requirements are to be met. Such requirements may relate especially to the sealing (against leakage or against the ingress of foreign substances) of the packaging, but they may also relate to the adhesion of the cover film to the base part of the packaging, to the impermeability of the packaging to certain substances, or to the force required to remove the cover film (peeling force). If a packaging is to be able to meet those requirements, the parameters during the thermal bonding of base part and cover film (duration, pressure, temperature) must always remain within predetermined limits and have to be reproducible.

Therefore, the adhesion of the cover film to the packaging must be such that it is sealed against the ingress of foreign substances from the outside and that it shall prevent the saline solution from leaking out. Furthermore, the packaging must not be damaged, for example, during the sterilization step, which normally takes place in an autoclave. In addition, the peeling force required to remove the cover film from the base part, that is to say to open the packaging, should not exceed a maximum value in order that the user is able to open the packaging with a reasonable amount of effort while ensuring the crucial sealing requirements discussed previously.

Apparatuses known in the art include a bonding head having a bonding contour support, a heatable bonding contour and a carrier. A rubber mount associated with the bonding head serves as a joint element and allows the bonding contour support to be tilted about axes that are perpendicular to guide bolts allowing for a linear displacement of the bonding head relative to the carrier.

This kind of apparatus has several disadvantages especially in respect of the above-mentioned demands that must be met when packaging contact lenses. In particular, the bonding head is prone to rotational movement as the rubber mount does not prevent rotational movement around the displacement axis along the guide bolts resulting in a twisting of the rubber mount which leads to a rotation of the bonding contour with respect to the packaging. Even slight rotation of the rubber mount may cause deficiencies in the sealing of the packaging preventing the packaging from meeting the strict requirements. Additionally, material fatigue of the rubber mount will have anticipated negative influence on the sealing quality of the device.

In order to meet the above mentioned requirements, the movement of the holding device and/or the bonding unit must be such that those surfaces of the holding device and of the bonding unit which transfer the sealing pressure to the packaging are very exactly parallel to one another while the orientation of the bonding contour with respect to the packaging must remain in an accurate predetermined position as even very slight fluctuations can result in significant variations in the sealing pressure and therefore in a seal that does not meet the requirements mentioned.

SUMMARY OF THE INVENTION

These and other objects of the invention are achieved with an apparatus as specified by the features of the respective independent claims. Advantageous aspects of the apparatus according to the invention are the subject of the dependent claims.

As used in the specification including the appended claims, the singular forms "a", "an", and "the" include the plural, unless the context explicitly dictates otherwise. Also, whenever features are combined with the term "or", the term "or" is to be understood to also include "and" unless it is evident from the specification that the term "or" must be understood as being exclusive.

In accordance with the invention, an apparatus for thermally bonding together a cover film of an ophthalmic lens package, such as a contact lens package, in particular a soft contact lens package, and a base part of the ophthalmic lens package, is suggested.

The apparatus comprises:
  a carrier for supporting the base part and the cover film arranged on the base part in a predetermined orientation and to be thermally bonded to an upper surface of the base part;
  a bonding unit arranged above the carrier, said bonding unit comprising a mounting plate and a bonding stamp extending from the mounting plate towards the carrier, the bonding stamp comprising a mounting portion fixedly attached to the mounting plate, a bonding head arranged beneath the mounting portion and having a heatable bonding contour arranged on a side of the bonding head facing the carrier, and an articulated connector arranged between the mounting portion and the bonding head, with the articulated connector being attached to both the mounting portion and the bonding head and connecting the bonding head to the mounting portion in a manner so as to allow for tilting of the bonding head relative to the mounting portion; and
  an actuator for performing a linear relative movement of the carrier and the bonding stamp towards and away from each other along a displacement axis, to allow for thermally bonding the cover film with the base part by pressing the heated bonding contour of the bonding head against the cover film arranged on the base part, and to allow for subsequent separation of the bonding head from the cover film bonded to the base part, wherein the articulated connector connecting the bonding head to the mounting portion is a cardanic joint having two rotational axes, a first and a second rotational axis, the first rotational axis being arranged normal to the displacement axis, and the second rotational axis being arranged orthogonal to the first rotational axis.

According to one aspect of the apparatus according to the present invention, the cardanic joint comprises two plates, an upper plate and a lower plate, the upper plate being fixedly attached to the mounting portion of the bonding stamp and holding a first axle having a first longitudinal axis forming the first rotational axis and the lower plate being fixedly attached to the bonding head and holding a second axle having a second longitudinal axis forming the second rotational axis, and wherein the cardanic joint further comprises a coupler holding both the first and the second axle, the coupler pivotably connecting the upper and lower plates.

According to a further aspect of the apparatus according to the present invention, each of the upper and lower plates comprises projections and recesses, which are alternatingly arranged along the circumference of the upper and of the lower plate respectively, the projections of the upper plate extending towards the lower plate and into a corresponding one of the recesses of the lower plate, and the projections of the lower plate extending towards the upper plate and into a corresponding one of the recesses of the upper plate.

According to a still further aspect of the apparatus according to the present invention, the articulated connector comprises an interior space surrounded by the projections and recesses of the upper and lower plates, and wherein the coupler is arranged in the interior space of the articulated connector.

According to yet a further aspect of the apparatus according to the present invention, the projections of each of the upper or lower plates are arranged diametrically opposite to each other, wherein each of the projections has a through-hole extending radially through the respective projection with the axes of the through-holes of diametrically oppositely arranged projections coinciding and wherein the first and second axles are accommodated in the through-holes of the projections of the upper and lower plates, respectively.

According to a further aspect of the apparatus according to the present invention, the first axle comprises two axle elements arranged in the articulated connector such that the two axle elements are aligned and form the first axle, and wherein the two axle elements of the first axle are arranged in the articulated connector such that the two axle elements forming the first axle abut to the second axle in a zone where longitudinal axes of the respective axles are crossing.

In accordance with a further aspect of the apparatus according to the present invention, the articulated connector comprises at least one attenuator arranged between the upper and the lower plate.

In accordance with still a further aspect of the apparatus according to the present invention, the at least one attenuator is arranged between the upper and the lower plate in a peripheral zone of the upper and lower plates.

In accordance with yet a further aspect of the apparatus according to the present invention, the articulated connector comprises at least two attenuators, one attenuator being arranged between the upper plate and the coupler and the second attenuator being arranged between the coupler and the lower plate.

According to a further aspect of the apparatus according to the present invention, the attenuator is made of rubber.

According to a still further aspect of the apparatus according to the present invention, the articulated connector comprises a circumferentially running groove arranged at the circumference of the articulated connector in the projections of the upper and lower plates and wherein the articulated connector further comprises a retainer ring arranged in the groove and locking the first and second axles in their respective position.

According to a further aspect of the apparatus according to the present invention, at least one of the upper or lower plate comprises a locking bore and at least one of the mounting portion or bonding head comprises a locking bolt cooperating with the locking bore and rotationally locking the articulated connector with respect to the mounting portion or to the bonding head, respectively.

According to yet a further aspect of the apparatus according to the present invention, at least one of the upper or lower plate comprises a positioning bolt and at least one of the mounting portion or bonding head comprises a positioning bore cooperating with the positioning bolt and rotationally locking the articulated connector with respect to the mounting portion or to the bonding head, respectively.

The apparatus according to the invention uses a cardanic joint having two, and only two, rotational axes arranged such that the bonding contour of the bonding head will be in the plane of the upper surface of the base part when pressure is applied to the cover film pressed onto the upper surface of the base part. The apparatus allows for a very accurate positioning of the bonding head and prevents twisting of the bonding head around the displacement axis of the apparatus, resulting in reproducible thermal bonding of the cover film to the base part of an ophthalmic lens package. Additionally, the articulated connector according to the invention allows for a high-speed operation of the bonding step, as the bonding head has a precise orientation which is insured by the cardanic joint having only two rotational axis.

The articulated connector according to the invention is particularly adapted for generating a uniform pressure along the join between the upper surface of the base part and the cover film for ensuring a good bond between the base part and the cover film. All lens packages will have to meet the high requirements with regards to quality and reproducibility of the bond. Actually, one prerequisite of a good bond is a pressure along the join which is as uniform as possible. The upper surfaces of individual base parts with the overlying cover film are in practice not always arranged exactly in the same plane, especially since there are always a multiplicity of such base parts arranged on a carrier at the same time and bonded to the cover film at the same time.

The articulated connector allowing for continuous tilting in a plane which is orthogonal to the displacement axis of the bonding unit, the bonding contour may tilt about the cardanic joint in the event of a base part not being arranged exactly parallel to the bonding contour, resulting in a pivoted bonding head applying a uniform pressure along the join between the base part in the cover film. Although, in practice, these pivoting movements are extremely small, they are of highest importance for a high-quality bond between the base part and the cover film. At the same time, the apparatus according to the invention ensures a proper rotational orientation of the bonding head with respect to the lens package to be bonded as the cardanic joint prevents twisting of the bonding head with respect to the mounting portion and to the carrier receiving the packagings (pieces of packaging) that are to be sealed. This is a further prerequisite for meeting the quality requirements as even a slight rotational movement of the bonding head around the displacement axis may result in seals not meeting the strict requirements.

The articulated connector may have any suitable shape, such as cylindrical with a circular cross-section or an oblong cross-section or with a rectangular cross-section or any other cross-section.

The articulated connector according to the invention additionally has excellent resistance against fatigue, as most of the parts, if not all, may be particularly made of metal, in particular of stainless steel. Even if parts of the connector, such as attenuators, may be subject to fatigue due to repeatedly applied loads, there is no need to replace the entire articulated connector. The structural damage of the parts in question being locally contained, exchanging only the parts which are weakened by the cyclic loading will be sufficient.

The use of a cardanic joint comprising two plates holding a first axle and a second axle being pivotally connected by the coupler is a practical embodiment of the invention which has shown to be particularly advantageous. Projections and recesses in the upper and lower plates allow for accommodation of the axles thereby connecting the corresponding axle to the upper or to the lower plate.

The projections and recesses engender an interior space further delimited by the upper and lower plate. The coupler may be particularly advantageously arranged in the interior space within the articulated connector for connecting the upper and lower plates of the articulated connector.

When the projections of each of the upper and lower plates are arranged diametrically opposite to each other and have through holes extending radially through the respective projection, the first and second axles may be accommodated in the through-holes and will allow for holding the first and the second axles. The first and second axles will then, by way of the coupler, pivotably connect the upper and lower plates of the articulated connector and allow for very accurate positioning of the bonding contour with respect to the upper surface of the corresponding base part. Radially is to be understood as running straight-lined from one point.

One axle may comprise two axle elements such that the two axle elements are aligned to form the first or the second axle (it is to be noted that either the first axle or the second axle may be formed by two axle elements as well) and allows for easy accommodation of the two axles in the articulated connector. The two axle elements will then be configured to abut to the second axle in the zone where the longitudinal axes of the two axles are crossing.

The articulated connector may comprise at least one attenuator arranged between the upper and the lower plate in order to attenuate the tilting movement of the articulated connector and allowing for return of the bonding head to the starting position. These attenuators may be easily exchanged in case they need to be renewed due to fatigue. This may particularly be advantageous when the attenuators are made of rubber. In case the attenuators are damaged due to fatigue, these damaged attenuators may be easily replaced by new attenuators without having to replace of the complete articulated connector. In particular, at least two attenuators, particularly two pairs of attenuators, may be arranged between the upper and the lower plates in a peripheral zone of the upper and lower plates. The peripheral zone of the upper and lower plates is a zone arranged between the interior space and the outer radial circumference of the articulated connector.

The at least two attenuators may particularly be arranged between the projection of the upper plate and the recess of the lower plate or between the projection of the lower plate and the recess of the upper plate. Particularly, when each of the upper and lower plate has two diametrically opposite projections and two diametrically opposite recesses, two pairs of attenuators may be arranged between the upper and the lower plates, the first pair being arranged between diametrically opposite projections of the upper plate and recesses of the lower plate and the second pair being arranged between diametrically opposite projections of the lower plate and recesses of the upper plate.

The attenuators may particularly be replaceable and the elastic attenuation of the articulated connector may be adjusted to the requirements by the use of O-rings having customized elasticities and will hence have an impact on the rigidity of the articulated connector. In particular, attenuators each have a hardness of 55 Shore A or more. Although the upper limit of the hardness may be chosen according to the needs, the attenuators particularly have a hardness of up to 150 Shore A. The material the O-ring is made of may also be chosen depending on other mechanical and thermal requirements.

The attenuators may particularly be configured (for example by adjusting the thickness of the attenuators) to permanently apply a force between the upper and lower plates of the articulated connector such that the attenuators restore the starting position of the articulated connector between each bonding cycle. Additionally, the use of such attenuators results in an articulated connector free of clearance. Particularly, the attenuators may have each a thickness that extends from the first plate to the second plate in the starting position of at least 0.15 mm. Particularly, a thickness that extends from the first plate to the second plate is comprised between 0.2 mm and 0.5 mm.

The circumferentially running groove receives a retainer ring which locks the first and the second axles in their respective position, in particular when the first and second axles are accommodated in the through-holds of the projections of the upper and lower plates. The circumferentially running groove may be, for example, an indentation which is radially arranged at the periphery of the articulated connector and extending from a radial outer surface of the articulated connector towards a center of the articulated connector which is arranged at the intersection of the first and the second axles. The retainer ring is particularly removably arranged in the groove or in the indentation. Such removable retainer ring allows for unlocking the first and second axles for easy removal of the first and second axles and simple disassembly of the articulated connector and access to the interior space of the articulated connector.

The first and second axles may particularly form-fitted allowing for gliding removal of the axles from the articulated connector when the retainer ring is removed. A disassembly of the articulated connector may particularly be advantageous for replacing parts such as the attenuators, which may be deteriorated due to fatigue.

Locking bores in the upper or lower plate as well as locking bolts may be arranged in the mounting portion or in the bonding head and allow for rotationally locking the articulated connector with respect to the mounting portion or to the bonding head. The locking bore may as an alternative be arranged in the mounting portion or in the bonding head and the locking bolt accordingly in the upper or in the lower plates. The locking bolts may, for example, be pins, screws or any other suitable locking element.

The apparatus according to the invention may also be provided with both locking bores and positioning bolts in the upper or lower plate and corresponding locking bolts and positioning bores in the mounting portion or in the bonding head. This latter configuration allows for a predetermined rotational orientation of the bonding head during assembly of the apparatus when two locking elements are present and the configuration avoids an unintentional rotation around the displacement axis of the apparatus during assembly. Alternatively, the locking bolts and corresponding locking bores may be of different size such that an assembly in an incorrect rotational orientation will not be possible.

The afore-mentioned embodiments are practical embodiments for thermally bonding together a cover film of an ophthalmic lens package and a base part of the ophthalmic lens package.

Further embodiments and advantages become apparent from the following description of detailed embodiments of the apparatus according to the invention with the aid of the drawings.

It is to be noted that generally any of afore-described features or aspects of the invention can be combined with any other afore-described feature or aspect of the invention as long as such combination is not mutually exclusive.

BRIEF DESCRIPTION OF THE DRAWINGS

Further advantageous aspects of the invention become apparent from the following description of embodiments of the invention with the aid of the drawings in which:

FIG. 1 shows an embodiment of the carrier for accommodating base parts of a contact lens package;

FIG. 2a shows an embodiment of a base part of a contact lens package which can be accommodated by the holding device according to FIG. 1;

FIG. 2b shows an embodiment of a packaging comprising a cover film and a base part which can be accommodated by the holding device according to FIG. 1;

FIG. 5 shows a view of a heatable contact plate of the bonding head having a heatable bonding contour from below FIG. 6 is a schematic view of an embodiment of the articulated connector according to the invention;

FIG. 7 is a cross-sectional view of the articulated connector shown in FIG. 6;

DETAILED DESCRIPTION OF EMBODIMENTS

Figure 3:
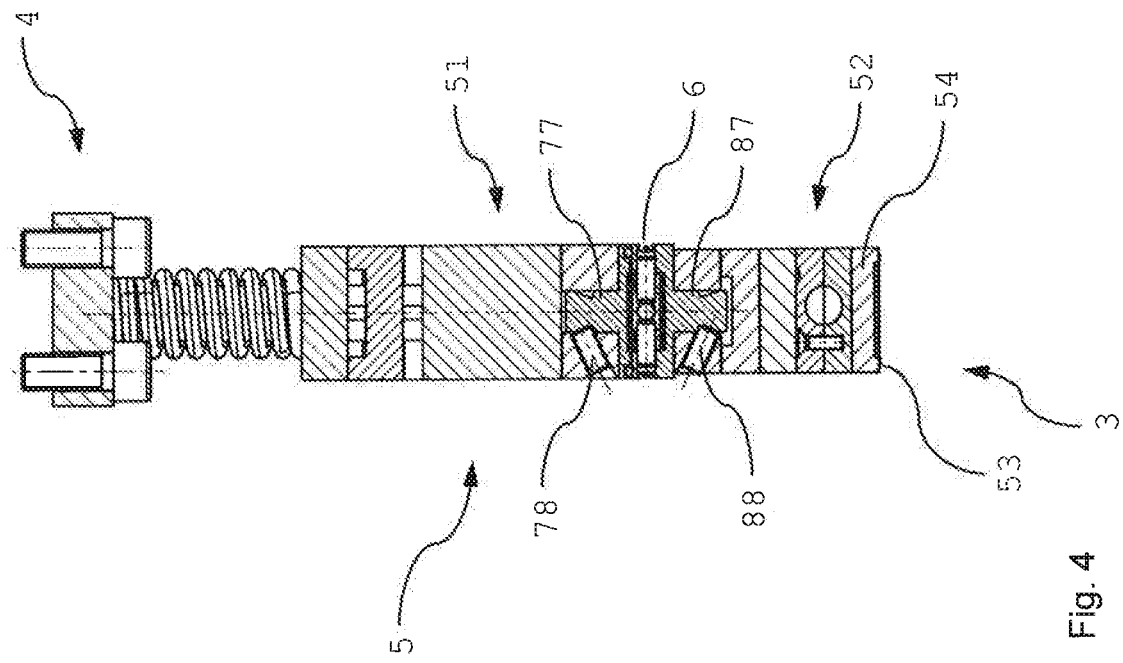
FIG. 3 shows a cross-sectional view of an embodiment of an articulated connector and its mounting arrangement.

FIG. 1 shows an embodiment of a carrier 2 comprising essentially a support 21 on which a number of individual holding elements 22 are arranged in a well-defined position. In the embodiment shown in FIG. 1, five holding elements 22 are arranged on the carrier 2. The holding elements 22 are each suitable for accommodating a base part 12 of a contact lens package 1.

Such a base part 12 and packaging 1 comprising a base part 12 and a cover film 11, which can be accommodated by the holding elements 22, are shown in FIG. 2a and FIG. 2b, respectively. The base parts 12, which may be produced, for example, by injection-molding, have a droplet-shaped depression into which the contact lens to be packaged as well as a saline solution are introduced. A cover film 11 is then placed onto the base part 12 and bonded it to. The manner in which the bonding of the base part 12 and the cover film 11 can be affected will be described in more detail below.

FIG. 3 shows a bonding unit 3 and its individual components. As can be seen from FIG. 3, the bonding unit 3 comprises a mounting plate 4 and a bonding stamp 5. The bonding stamp 5 extends downwardly from the mounting plate 4 towards the carrier 2 above which the bonding unit 3 will be arranged during operation. The bonding stamp 5 further comprises a mounting portion 51 which is fixedly attached to the mounting plate 4 and a bonding head 52 arranged beneath the mounting portion 51. The bonding head 52 has a heatable bonding contour 53 which is arranged on the side of the bonding head 52 facing the carrier 2 during operation. The heatable bonding contour 53 will come into contact with the surface of the cover film 11 remote from the base part 12 during the thermal bonding of base part 12 and cover film 11.

The heatable bonding contour 53 is arranged on a contact plate 54 and bonds the cover film 11 to an upper surface of the base part 12 along the heatable bonding contour 53. The shape of the heatable bonding contour 53 corresponds to the desired shape of the join to be generated between the cover film 11 and the upper surface of the base part 12. In the present embodiment, the shape of the bonding contour 53 approximately the shape of a droplet and can be seen in more detail in FIG. 5, in which the contact plate 54 is shown in a view from below.

According to FIG. 3, the bonding unit 3 also has an articulated connector which is a cardanic joint 6. The cardanic joint 6 arranged between the mounting portion 51 and the bonding head 52 and pivotably connects the bonding stamp 5 to the mounting plate 4. One side of the cardanic joint 6 is attached to the mounting portion 51 via a first mounting pin 77 and the other side of the cardanic joint 6 is attached to the bonding head 52 via a second mounting pin 87. The cardanic joint 6 connects the bonding head 52 and the mounting portion 51 in a manner so as to allow for tilting of the bonding head 52 relative to the mounting portion 51.

The bonding unit 3 further comprises an actuator 10 performing a linear relative movement of the bonding stamp 5 towards and away of the carrier 2 along a displacement axis. Alternatively, an actuator may be arranged such that the carrier 2 performs a linear relative movement towards and away from the bonding stamp 5. The actuator 10 is configured to lower, for example pneumatically, the bonding stamp 5 and thereby pressing the heated bonding contour 53 against the cover film 11 placed onto the base part 12 in order to bond the cover film 11 to the base part 12.

Figure 4:
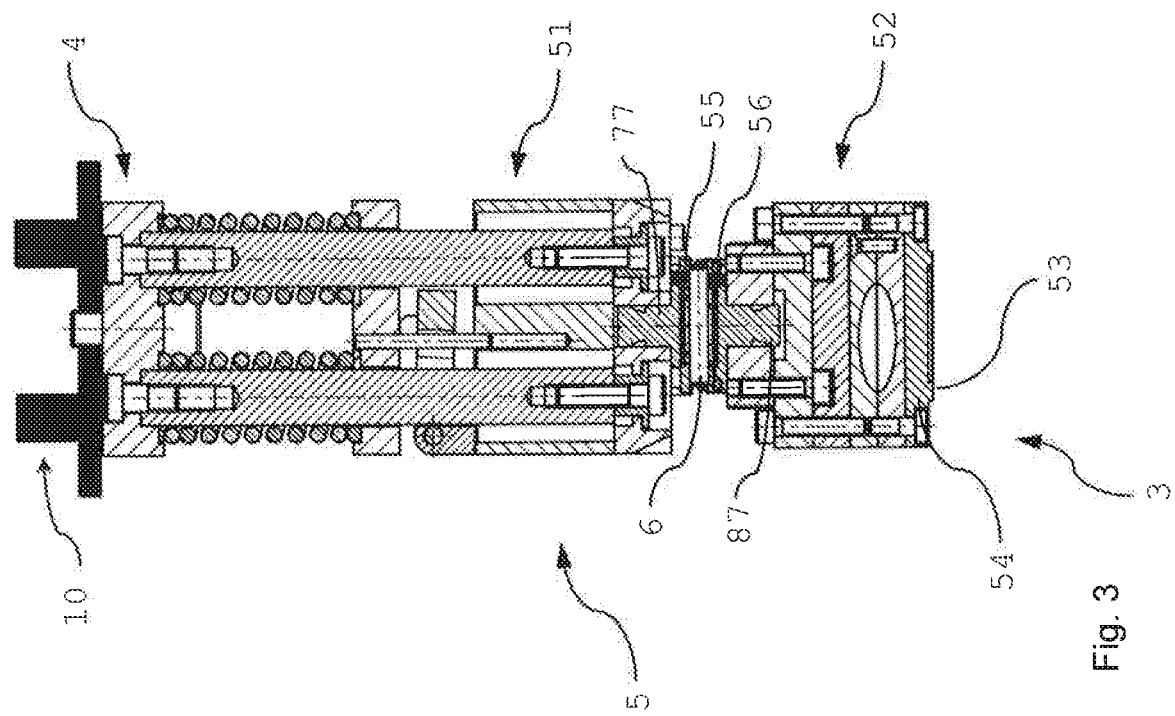
FIG. 4 shows another cross-sectional view of an embodiment of an articulated connector and its mounting arrangement.

FIG. 4 shows a further cross-sectional side view of the bonding unit 3 shown in FIG. 3. As can be seen from FIG. 4, the first and second mounting pins 77 and 87 are maintained in position in bores in the mounting portion 51 and in the bonding head 52 by screws 78 and 88. The mounting pins have recesses into which the screws 78 and 88 are inserted in order to lock the cardanic joint 6 in the mounting portion 51 or in the bonding head 52.

As can be seen from FIG. 6 to FIG. 11, showing several embodiments according to the invention, the articulated connector connecting the bonding head 52 to the mounting portion 51 is a cardanic joint 6 having two rotational axes, a first and a second rotational axis. The first rotational axis is arranged normal to the displacement axis of the apparatus and the second rotational axis is arranged orthogonal to the first rotational axis. In the present embodiments, the cardanic joint comprises two plates, an upper plate 7 and a lower plate 8.

The upper plate 7 is fixedly attached to the mounting portion 51 of the bonding stamp 5 by the mounting pin 77 and holds a first axle 71 having a first longitudinal axis forming the first rotational axis. The lower plate 8 is fixedly attached to the bonding head 52 by the mounting pin 87 and holds a second axle 81 having a second longitudinal axis forming the second rotational axis. Both the first and the second axles 71, 81 are connected by a coupler 9, thereby pivotably connecting the upper and lower plates. The function of the coupler 9 will be described in more detail below.

In the embodiment shown in FIG. 6, each of the upper and lower plates comprise each two projections 72, 82 and two recesses 73, 83 which are alternatively be arranged along the circumference of the upper and of the lower plate 7, 8 respectively and diametrically opposite to each other. The projections 72 of the upper plate 7 extend towards the lower plate 8 and into a corresponding one of the recesses 83 of the lower plate 8. In an analogous way, the projections 82 of the lower plate 8 extend towards the upper plate 7 and into a corresponding one of the recesses 73 of the upper plate 7. Each of the projections 72, 82 has a through-hole 74, 84 extending radially through the respective projection 72, 82 and holding the first and second axles 71, 81.

In the embodiment shown in FIG. 6 and FIG. 7, the first and second axles 71, 81 are press-fitted in the through-holes 74, 84 such that each of the axles are locked in each respective projection without further locking element. The cardanic joint 6 further comprises an interior space 61 which is surrounded by the projections 72, 82 and recesses 73, 83 and by the upper and lower plates 7, 8.

Additionally, in the embodiment shown in FIG. 6, the upper and lower plates 7, 8 comprises a locking bore 75, 85 for cooperating with the locking bolts 55, 56 on the mounting portion 51 or the bonding head 52 thereby rotationally locking the cardanic joint 6 with respect to the mounting portion 51 or to the bonding head 52, respectively. Each of the upper and lower plates 7, 8 may comprise more than one locking bore 75, 85 which may be non-symmetrical for secure a positioning of the cardanic joint 6 during assembly of the apparatus.

As can be seen in FIG. 7, the coupler 9 pivotably holds both the first and the second axle 71, 81 in an orthogonal position to one another pivotably connects the upper and lower plates 7, 8. The coupler 9 can be seen in more detail in FIG. 10 for the second embodiment shown and its function described in detail below.

In the embodiment shown in FIG. 7, the cardanic joint 6 comprises two attenuators 62 in form of O-rings 621, 622, one O-ring 621 being arranged between the upper plate 7 and the coupler 9 and the second O-ring being arranged between the coupler 9 and the lower plate 8. The O-rings 621, 622 of may be made of rubber. The O-ring 621, 622 act as returners which restore the starting position between each bonding cycle.

A second embodiment is shown in FIG. 8 to FIG. 11. The cardanic joint 6 in the embodiment shown particularly in FIG. 8 comprises a circumferentially running groove 63 arranged at the circumference of the cardanic joint 6 in the projections 72, 82 of the upper and lower plates 7, 8. A retainer ring 64 is arranged in the groove 63 and locks the first and second axles 71, 81 in their respective position. In this embodiment, the first and second axles 71, 81 are not press-fitted in the through holes 74, 84, but rather form-fitted such that the axles 71, 81 may easily be removed from the cardanic joint 6 in the absence of the retainer ring 64. The retainer ring 64 holds the axles 71, 81 in their position within the articulated connector 6 and avoids a transitional displacement of the axles 71, 81.

Figure 9:
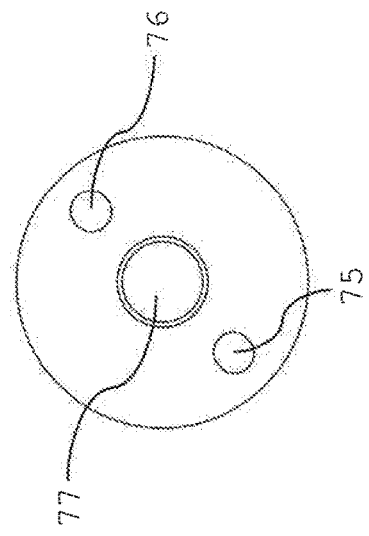
FIG. 9 is a view from above of the articulated connector shown in FIG. 8.
Figure 8:
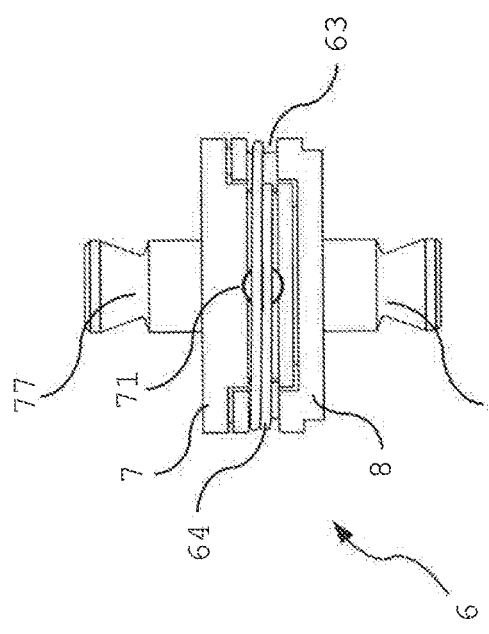
FIG. 8 is a side elevational view of another embodiment of the articulated connector according to the invention.

FIG. 9 shows an cardanic joint 6 having a locking bore 75 and a positioning bolt 76 on the upper plate 7 for cooperating with a locking bolt 55, 56 and a positioning bore 57, 58 on the mounting portion 51 or the bonding head 52 thereby rotationally locking the cardanic joint 6 with respect to the mounting portion 51 or to the bonding head 52, respectively and ensuring proper orientation during assembly due to the asymmetric design of the locking bore 75 and a positioning bolt 76.

Figure 11:
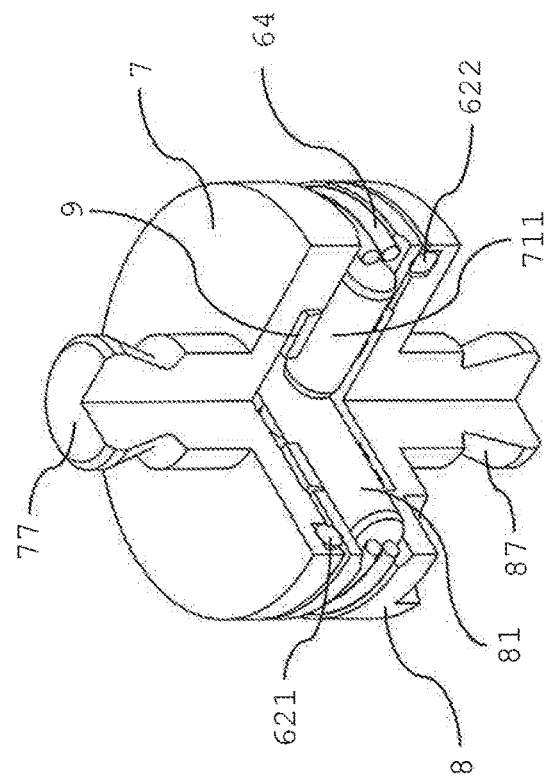
FIG. 11 is a cross-sectional view of the articulated connector shown in FIG. 8.
Figure 10:
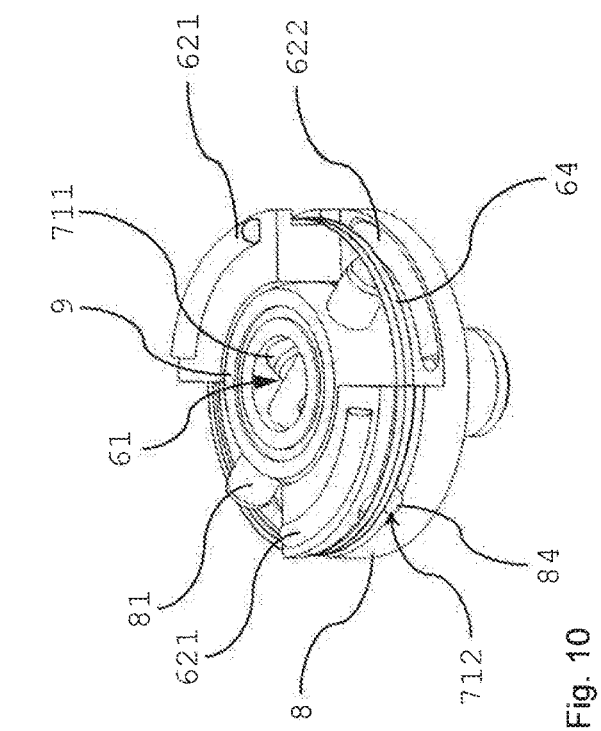
FIG. 10 is a part view of the articulated connector shown in FIG. 8.

In this embodiment as can be clearly seen from FIG. 10 and FIG. 11, the cardanic joint 6 comprises four attenuators 621, 622 arranged in a peripheral zone of the cardanic joint 6 between the upper and the lower plates 7, 8. The attenuators 621, 622 are formed by parts of O-rings and are disposed in pairs between the projections 72 of the upper plate 7 and the recesses 83 of the lower plate 8 and between the projections 82 of the lower plate 8 and the recesses 73 of the upper plate 7. The pairs of attenuators 621, 622 are arranged diametrically opposite to each other in the respective pair 621, 622. Alternatively, two O-rings may be arranged in the interior space 61 of the cardanic joint 6, one O-ring being arranged between the upper plate 7 and the coupler and the second O-ring between the coupler 9 and the lower plate 8 as described for the previous embodiment.

As can be seen best from FIG. 10, the cardanic joint 6 further comprises a coupler 9 arranged in the interior space 61 of the cardanic joint 6. The coupler 9 is formed by a cylindrical annulus. The coupler 9 is provided with two pairs of diametrically opposite through-holes extending radially from the rotational axis of the cylindrical annulus through the wall of the cylindrical annulus with the axes of the diametrically oppositely arranged through-holes coinciding. The through-holes are configured for receiving the first and second axles 71, 81 of the cardanic joint 6 in a form-fit manner allowing for rotation of the first and second axles in the coupler and allowing for gliding removal of the axles for disassembly of the cardanic joint 6.

The embodiment shown in FIG. 10 and FIG. 11 clearly depicts that the first axle 71 comprises 2 axle elements 711, 712 arranged in the cardanic joint 6. The two axle elements 711, 712 of the first axle abut to the second axle 72 in a zone where the longitudinal axis of the first and second 71, 72 axles are crossing. The second axle 72, in this embodiment, is formed by one continuous axle element.

As can be clearly seen from FIG. 11, each of the upper and lower plate 7, 8 has two diametrically opposite projections 72, 82 and two diametrically opposite recesses 73, 83. Two pairs of diametrically oppositely arranged attenuators 621, 622 are arranged between the upper and the lower plates 7, 8. The first pair of attenuators 621 is arranged between diametrically opposite projections 72 of the upper plate 7 and recesses 83 of the lower plate 8 and the second pair of attenuators 622 is arranged between diametrically opposite projections 82 of the lower plate 8 and recesses 73 of the upper plate 7.

The apparatus operates as follows: the base parts 12 are held ready in the depressions of the holding elements 22 of the carrier 2 and the cover film 11 comprising a sealable coating is placed onto those base parts 12, the sealable coating of the cover film 11 facing the upper surface of the base parts 12. Using the actuator 10 to move the carrier 2 and the bonding stamp 5, the latter are moved towards one another until the heated bonding contour 53 presses the cover film 11 against the upper surface of the base parts 12 at a predetermined pressure.

While moving together the carrier 2 comprising the base parts 12 and the cover film 11 and the bonding head 52, the individual bonding heads 52 pivot about the articulated connector if the base part in question is not arranged exactly parallel with the heated bonding contour. As the cover film 11 is pressed against the base part 12 by means of the heated bonding contour 53, the sealable coating is heated and, under the action of pressure and temperature, the base part 12 and the cover film 11 are bonded together along the heated bonding contour 53.

To this purpose, the heated bonding contour 53 exerts a desired pressure force on to the cover film disposed on the base parts 4 and exactly defined period of time resulting in the base parts and the cover film being bonded to one another. The carrier 2 and the bonding head 52 are then separated from one another along the displacement axis and the finished contact lens packages can be conveyed to a further processing step since, in the case described, the cover film 11 is in one piece and extends over several individual base parts 12, the finished contact lens packages in the embodiment shown arrangements of 5 interconnected packagings.

For example, the contact lens packages may be conveyed to a magazine in which a large number of such packages, each of 5 packagings, is connected before the entire magazine is conveyed to a sterilizing apparatus, for example an autoclave.

Although the invention has been described with the aid of specific embodiments, it is evident to the person skilled in the art that this embodiment has been described by way of example only and that various changes and modifications are conceivable without departing from the teaching underlying the invention. Therefore, the scope of protection is not intended to be limited by the embodiments described, but rather is defined by the appended claims.

The invention claimed is:

1. Apparatus for thermally bonding together a cover film (11) of an ophthalmic lens package (1) and a base part (12) of the ophthalmic lens package (1), the apparatus comprising:
a carrier (2) for supporting the base part (12) and the cover film (11) arranged on the base part (12) in a predetermined orientation and to be thermally bonded to an upper surface of the base part (12);
a bonding unit (3) arranged above the carrier (2), said bonding unit (3) comprising a mounting plate (4) and a bonding stamp (5) extending from the mounting plate (4) towards the carrier (2), the bonding stamp (5) comprising a mounting portion (51) fixedly attached to the mounting plate (4), a bonding head (52) arranged beneath the mounting portion (51) and having a heatable bonding contour (53) arranged on a side of the bonding head (52) facing the carrier (2), and an articulated connector (6) arranged between the mounting portion (51) and the bonding head (52), with the articulated connector (6) being attached to both the mounting portion (51) and the bonding head (52) and connecting the bonding head (52) to the mounting portion (51) in a manner so as to allow for tilting of the bonding head (52) relative to the mounting portion (51); and
an actuator (10) for performing a linear relative movement of the carrier (2) and the bonding stamp (5) towards and away from each other along a displacement axis, to allow for thermally bonding the cover film (11) with the base part (12) by pressing the heated bonding contour (53) of the bonding head (52) against the cover film (11) arranged on the base part (12), and to allow for subsequent separation of the bonding head (52) from the cover film (11) bonded to the base part (12),
wherein the articulated connector (6) connecting the bonding head (52) to the mounting portion (51) is a cardanic joint (6) having two rotational axes, a first and a second rotational axis, the first rotational axis being arranged normal to the displacement axis, and the second rotational axis being arranged orthogonal to the first rotational axis; and further wherein the cardanic joint (6) comprises two plates (7, 8), an upper plate (7) and a lower plate (8), the upper plate (7) being fixedly attached to the mounting portion (51) of the bonding stamp (5) and holding a first axle (71) having a first longitudinal axis forming the first rotational axis and the lower plate (8) being fixedly attached to the bonding head (52) and holding a second axle (81) having a second longitudinal axis forming the second rotational axis, and wherein the cardanic joint (6) further comprises a coupler (9) holding both the first and the second axle (71, 81), the coupler (9) pivotably connecting the upper and lower plates (7, 8).

2. Apparatus according to claim 1, wherein each of the upper and lower plates (7, 8) comprises projections (72, 82) and recesses (73, 83), which are alternatingly arranged along the circumference of the upper and of the lower plate (7, 8) respectively, the projections (72) of the upper plate (7) extending towards the lower plate (8) and into a corresponding one of the recesses (83) of the lower plate (8), and the projections (82) of the lower plate (8) extending towards the upper plate (7) and into a corresponding one of the recesses (73) of the upper plate (7).

3. Apparatus according to claim 2, wherein the articulated connector (6) comprises an interior space (61) surrounded by the projections (72, 82) and recesses (73, 83) of the upper and lower plates (7, 8), and wherein the coupler (9) is arranged in the interior space (61) of the articulated connector (6).

4. Apparatus according to claim 3, wherein the projections (72, 82) of each of the upper or lower plates (7, 8) are arranged diametrically opposite to each other, wherein each of the projections (72, 82) has a through-hole (74, 84) extending radially through the respective projection (72, 82) with the axes of the through-holes (74, 84) of diametrically oppositely arranged projections (72, 82) coinciding and wherein the first and second axles (71, 81) are accommodated in the through-holes (74, 84) of the projections (72, 82) of the upper and lower plates (7, 8), respectively.

5. Apparatus according to claim 4, wherein the first axle (71) comprises two axle elements (711, 712) arranged in the articulated connector (6) such that the two axle elements (711, 712) are aligned and form the first axle (71), and wherein the two axle elements (711, 712) of the first axle (71) are arranged in the articulated connector (6) such that the two axle elements (711, 712) forming the first axle (71) abut to the second axle (72) in a zone where longitudinal axes of the respective axles are crossing.

6. Apparatus according to claim 3, wherein the first axle (71) comprises two axle elements (711, 712) arranged in the articulated connector (6) such that the two axle elements (711, 712) are aligned and form the first axle (71), and wherein the two axle elements (711, 712) of the first axle (71) are arranged in the articulated connector (6) such that the two axle elements (711, 712) forming the first axle (71)

abut to the second axle (72) in a zone where longitudinal axes of the respective axles are crossing.

7. Apparatus according to claim 2, wherein the projections (72, 82) of each of the upper or lower plates (7, 8) are arranged diametrically opposite to each other, wherein each of the projections (72, 82) has a through-hole (74, 84) extending radially through the respective projection (72, 82) with the axes of the through-holes (74, 84) of diametrically oppositely arranged projections (72, 82) coinciding and wherein the first and second axles (71, 81) are accommodated in the through-holes (74, 84) of the projections (72, 82) of the upper and lower plates (7, 8), respectively.

8. Apparatus according to claim 7, wherein the first axle (71) comprises two axle elements (711, 712) arranged in the articulated connector (6) such that the two axle elements (711, 712) are aligned and form the first axle (71), and wherein the two axle elements (711, 712) of the first axle (71) are arranged in the articulated connector (6) such that the two axle elements (711, 712) forming the first axle (71) abut to the second axle (72) in a zone where longitudinal axes of the respective axles are crossing.

9. Apparatus according to claim 2, wherein the first axle (71) comprises two axle elements (711, 712) arranged in the articulated connector (6) such that the two axle elements (711, 712) are aligned and form the first axle (71), and wherein the two axle elements (711, 712) of the first axle (71) are arranged in the articulated connector (6) such that the two axle elements (711, 712) forming the first axle (71) abut to the second axle (72) in a zone where longitudinal axes of the respective axles are crossing.

10. Apparatus according to claim 2, wherein the articulated connector (6) comprises a circumferentially running groove (63) arranged at the circumference of the articulated connector (6) in the projections (72, 82) of the upper and lower plates (7, 8) and wherein the articulated connector (6) further comprises a retainer ring (64) arranged in the groove (63) and locking the first and second axles (71, 81) in their respective position.

11. Apparatus according to claim 1, wherein the first axle (71) comprises two axle elements (711, 712) arranged in the articulated connector (6) such that the two axle elements (711, 712) are aligned and form the first axle (71), and wherein the two axle elements (711, 712) of the first axle (71) are arranged in the articulated connector (6) such that the two axle elements (711, 712) forming the first axle (71) abut to the second axle (72) in a zone where longitudinal axes of the respective axles are crossing.

12. Apparatus according to claim 1, wherein the articulated connector (6) comprises at least one attenuator (62) arranged between the upper and the lower plate (7, 8).

13. Apparatus according to claim 1, wherein the articulated connector (6) comprises at least one attenuator (62) arranged between the upper and the lower plate (7, 8) and wherein the at least one attenuator (62) is arranged between the upper and the lower plate (7, 8) in a peripheral zone of the upper and lower plates (7, 8).

14. Apparatus according to claim 13, wherein the attenuator (62; 621, 622) is made of rubber.

15. Apparatus according to claim 1, wherein the articulated connector (6) comprises at least two attenuators (621, 622), one attenuator (621) being arranged between the upper plate (7) and the coupler (9) and the second attenuator (622) being arranged between the coupler (9) and the lower plate (8).

16. Apparatus according to claim 1, wherein at least one of the upper or lower plate (7, 8) comprises a locking bore (75, 85) and at least one of the mounting portion (51) or bonding head (52) comprises a locking bolt (55, 56) cooperating with the locking bore (75, 85) and rotationally locking the articulated connector (6) with respect to the mounting portion (51) or to the bonding head (52), respectively.

17. Apparatus according to claim 1, wherein at least one of the upper or lower plate (7, 8) comprises a positioning bolt (76, 86) and at least one of the mounting portion (51) or bonding head (52) comprises a positioning bore (57, 58) cooperating with the positioning bolt (76, 86) and rotationally locking the articulated connector (6) with respect to the mounting portion (51) or to the bonding head (52), respectively.

\* \* \* \* \*